(12) United States Patent
Wang et al.

(10) Patent No.: US 7,757,638 B2
(45) Date of Patent: Jul. 20, 2010

(54) ANIMAL LITTER, PROCESS FOR PREPARING ANIMAL LITTER, AND METHOD OF REMOVAL OF ANIMAL WASTE

(75) Inventors: Lin Wang, Iowa City, IA (US); Sarjit Johal, Iowa City, IA (US); Thomas A. Wiesner, Muscatine, IA (US); Thomas L. Small, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 55 days.

(21) Appl. No.: 11/756,209

(22) Filed: May 31, 2007

(65) Prior Publication Data

US 2007/0277739 A1 Dec. 6, 2007

Related U.S. Application Data

(60) Provisional application No. 60/804,062, filed on Jun. 6, 2006.

(51) Int. Cl.
*A01K 29/00* (2006.01)
(52) U.S. Cl. .................. 119/173; 119/171; 119/172
(58) Field of Classification Search ............. 119/171, 119/172, 173, 169
See application file for complete search history.

(56) References Cited

U.S. PATENT DOCUMENTS

| | | | |
|---|---|---|---|
| 4,794,022 A | 12/1988 | Johnson et al. | |
| 5,927,049 A | 7/1999 | Simard | |
| 6,098,569 A | 8/2000 | Kent et al. | |
| 6,216,634 B1 | 4/2001 | Kent et al. | |
| 6,405,677 B2 | 6/2002 | McPherson et al. | |
| 6,622,658 B2 | 9/2003 | McPherson et al. | |
| 6,817,315 B1 * | 11/2004 | Tsengas et al. | 119/171 |
| 6,868,802 B2 | 3/2005 | McPherson et al. | |
| 2003/0205204 A1 * | 11/2003 | Wang et al. | 119/171 |
| 2004/0069237 A1 | 4/2004 | McPherson et al. | |
| 2006/0201438 A1 * | 9/2006 | Anttila et al. | 119/171 |
| 2007/0101941 A1 * | 5/2007 | Wang et al. | 119/171 |
| 2008/0223302 A1 * | 9/2008 | Wang et al. | 119/173 |

FOREIGN PATENT DOCUMENTS

| | | |
|---|---|---|
| EP | 1466522 | 10/2004 |
| EP | 1466522 A2 * | 10/2004 |
| WO | 0197604 | 12/2001 |
| WO | 03088739 | 10/2003 |

OTHER PUBLICATIONS

Chapter 4 African Oil Palm, http://www.fao.org/docrep/003/w3647e/W3647E04.htm [retrieved from internet Oct. 16, 2008] Jun. 28, 2003, 13 pages.*
PCT International Search Report and Written Opinion—dated Jul. 9, 2008.
International Search Report dated Sep. 22, 2008.

* cited by examiner

*Primary Examiner*—Andrea M Valenti
(74) *Attorney, Agent, or Firm*—Fitch, Even, Tabin & Flannery

(57) ABSTRACT

Disclosed is an animal litter that includes a palm oil residue, possibly in combination with another absorbent material such as whole ground grain, virgin germ, seed meal, spent germ or clay. The palm oil residue may be palm kernel cake, palm oil sludge, or palm pressed fiber. Also disclosed are a method for removing animal waste and a process for preparing an animal litter. The method for removal of animal waste includes allowing an animal to excrete waste into a container that includes a litter, the litter comprising a palm oil residue. The process for preparing an animal litter comprises combining the materials that make up the litter to form the litter.

14 Claims, No Drawings

ANIMAL LITTER, PROCESS FOR PREPARING ANIMAL LITTER, AND METHOD OF REMOVAL OF ANIMAL WASTE

This application claims the benefit of U.S. Provisional Application No. 60/804,062, filed Jun. 6, 2006, the entire disclosure of which is hereby incorporated by reference.

TECHNICAL FIELD OF THE INVENTION

The present invention relates to an animal litter, and more particularly to a litter that includes a palm oil residue, such as palm kernel cake, palm oil sludge, or palm pressed fiber. The invention further pertains to a process for preparing an animal litter, methods for removal of animal waste, and related products, processes, and methods.

BACKGROUND OF THE INVENTION

Numerous animal litters are known in the prior art. Commonly, animal litters are based on absorbent clays. The simplest animal litters include solely absorbent clays; in other cases, additives, such as odor control agents, adhesives, and other materials are included. Because animal urine has a strong odor of ammonia, many efforts have been made to provide animal litters that absorb ammonia and that prevent ammonia odors from escaping, particularly when the litter is employed for use with household cats.

Numerous litters are disclosed in U.S. Pat. Nos. 6,868,802; 6,622,658; 6,405,677; 6,216,634; and 6,098,569, all assigned to Grain Processing Corporation of Muscatine, Iowa. These patents provide excellent teachings as to organic, biodegradable litters that, in preferred embodiments, are based exclusively on natural materials. The litters disclosed in these patents have excellent ammonia absorbing properties.

The present invention seeks to provide an animal litter that differs from the heretofore described litters.

The Invention

It has now been found that palm oil residues are useful as animal litters, alone or in combination with other ingredients. A number of palm oil residues are produced commercially in connection with the production of palm oil. These ingredients are typically used as feed products in the beef and dairy industries. It has now been observed that certain palm oil residues have an excellent ammonia control property, and are useable as animal litters or as an ingredient in animal litters.

In one embodiment, the invention comprises a method for removal of animal waste, the method included providing a litter that includes a palm oil residue, allowing an animal to excrete waste into a quantity of the litter, and removing at least a portion of litter that has been soiled. The removal of the litter that has been soiled may comprise separation of at least a portion of the soiled litter from litter that has not been soiled, or may comprise removal and disposal of some or all of the unsoiled litter.

In another embodiment, the invention provides an animal litter. An animal litter in accordance with the present invention includes a palm oil residue in combination with one or more other ingredients, such as a clay, whole ground grain, seed meal, virgin grain germ, spent grain germ, or other absorbent material. The litter may take the form of either a clumping formulation or a non-clumping formulation. A litter prepared in accordance with the present teaching has been observed to have excellent odor control properties. Moreover, when the palm oil residue is used in connection solely with other biodegradable materials, a litter prepared in accordance with the present invention is biodegradable, and hence flushable in a sewer or septic system.

Also encompassed by the invention is a process for preparing an animal litter. The process includes combining the ingredients of the litter, the ingredients including palm oil residue and at least one other absorbent material as discussed hereinabove.

Further details concerning the preferred embodiments of the invention are set forth hereinbelow and in the appended claims.

DETAILED DESCRIPTION OF PREFERRED EMBODIMENTS

The animal litters of the preferred embodiments of the invention may be formulated as clumping litters or as non-clumping litters. When formulated as non-clumping litters, the litter preferably is formulated to take the form of pellets, or cubes, or tablets, or pellets, or other compacted forms, particularly when the litter is intended as a cat litter. The litters preferably are formulated such that the compacted forms break down when wetted into smaller particles or powders. When so formulated, a litter box that contains soiled and unsoiled litter may be shaken by hand, and soiled powdery litter will drop to the bottom of the box, leaving unsoiled litter at the top of the litter box. Tracking of litter out of the box by the cat is thus minimized.

After soiled litter has dropped to the bottom of the litter box, some or all of the soiled litter may be removed from the box, for instance, by separating the soiled litter from remaining unsoiled litter and disposing of the soiled litter. Alternatively, the soiled litter may be removed without separating it from any unsoiled litter in the box, by disposing of all or substantially all of the litter in the box. In either case, animal waste will be thereby removed. Optionally, the supply of litter may be replenished with fresh litter. If the litter is not used in a container (for instance, the litter is spread onto a field), the soiled litter may be removed from the area in which the litter originally was applied.

When the litter is formulated as a clumping litter, soiled litter may be removed by removing soiled clumps of litter. In either case, whether the litter is a clumping litter or is not a clumping litter, the removal of soiled litter preferably also contemplates the removal of solid waste.

Generally, the invention contemplates the use of a palm oil residue in an animal litter. The palm oil residue may be any oil residue from the Arecaceae family. Arecaceae (also known as Palmae), the palm family, is a family of flowering plants that is sometimes classified in the monocot order Arecales. There are over two hundred currently known genera in the family, collectively including around 2,600 species. Economically important genera include *Areca, Arenga, Attalea, Bactris, Borassus* (Palmyra palm), *Calamus* (Rattan palm), *Cocos* (Coconut), *Copernicia* (Carnauba wax palm), *Elaeis* (Oil palm), *Euterpe* (Cabbage Heart palm), *Jessenia, Jubaea* (Chilean Wine palm and Coquito palm), *Orbignya, Phoenix* (Date palm), *Raphia* (Raffia palm), *Rhapis, Roystonea* (Royal palm), *Sabal*—Palmettos, *Salacca,* Salak *Trachycarpus, Veitchia, Wallichia,* and *Washingtonia*. Oil palms in the genus *Elaeis* are among the most economically significant members, especially including dura palms, pisifera palms, and tenera palms. The invention preferably contemplates use of an oil residue from one of these species.

The oil residue may be any residue from a spent oil-bearing portion of the palm. By "spent" is contemplated the complete or substantial removal of oil via chemical or mechanical extraction or other form of separation. It is contemplated that some oil will remain in a spent oil residue in light of the limitations inherent in known commercial oil separation processes. The preferred oil bearing residues include palm pressed fiber (PPF), palm oil sludge (POS), and palm kernel cake (PKC). In the production of palm oil and palm kernel oil, the fruits of the oil palms are harvested in bunches, introduced to steam to loosen the berries in the bunches from stems, and introduced to rotating drums wherein the berries are broken loose from the stems. The berries are next cooked and crushed in digesters. Afterwards, the berries are introduced to screw presses, whereupon a "press liquor" is expressed. The press liquor contains oil, water, and sludge. The oil is separated and clarified in decanter tanks. The residue which, includes solids and water, is known as palm oil sludge. This material is preferably dewatered, such as by conventional drying, prior to use in an animal litter.

The pressed cake then goes through two cyclone separators. In the first separation, the hard palm kernels are separated from the pulp of the berry. In the second cyclone, the pulp is dewatered, yielding a residue known as palm pressed fiber. The kernels separated in the first cyclone are then cracked by machines and crushed, and subsequently cooked. Palm kernel oil is then expressed or extracted via a solvent, typically hexane. The remaining by-product is known as palm kernel cake.

The POS, PPF, or PKC may be used as an animal litter, alone or in combination with other materials. Any of the three palm oil residues discussed herein may be used in a litter in any amount with respect to other palm oil residues and in any percentage of the total composition. For instance, the palm pressed fiber may be used in an amount of 0%, 5%, 10%, 15%, 20%, 25%, 30%, 35%, 40%, 45%, 50%, 55%, 60%, 65%, 70%, 75%, 80%, 85%, 90%, 95%, or 100% by total dry weight of the animal litter. Likewise, the palm oil sludge may be used in an amount of 0%, 5%, 15%, 20%, 25%, 30%, 35%, 40%, 45%, 50%, 55%, 60%, 65%, 70%, 75%, 80%, 85%, 90%, 95%, or 100% by total dry weight of the animal litter. The palm kernel cake likewise may be used in an amount of 0%, 5%, 15%, 20%, 25%, 30%, 35%, 40%, 45%, 50%, 55%, 60%, 65%, 70%, 75%, 80%, 85%, 90%, 95%, or 100% by total dry weight of the animal litter.

The palm oil residue alternatively may be used in conjunction with one or more additional absorbent materials, such as a clay or other mineral. When used, any suitable clay or mineral may be used in conjunction with the invention. Suitable clays and minerals include sepiolite, bentonite, hectorite, beidelite, nontronite, saponite and other materials known to those skilled in the art, such as zeolite, montmorillonite, diatomaceous earth, opaline silica, crystalline silica, silica gel, Georgia White clay, sepiolite, calcite, dolomite, slate, pumice, tobermite, marls, attapulgite, kaolinite, halloysite, smectite, vermiculite, hectorite, Fuller's earth, fossilized plant materials, expanded perlite, and gypsum. Mixtures thereof may be employed in any desired ratio relative to one another. When clays are used, preferred clays are those that comprise principally alkali metal or alkaline earth bentonites, such as sodium bentonite, calcium bentonite, and sodium/calcium bentonite blends. The clay particles may have any suitable particle size, such as a size ranging from 0.05 to 10,000 microns.

The clay or clays may be used in any amount in the litter that is desired, and, if more than one type of clay is used, the clays may be used in any ratio with respect to one another. For instance, clay may be present in a total amount of 0%, 5%, 10%, 15%, 20%, 25%, 30%, 35%, 40%, 45%, 50%, 55%, 60%, 65%, 70%, 75%, 80%, 85%, 90%, or 95% by total dry weight of the litter. Clay is generally not used in formulations that are designed to be biodegradable, for instance, when a flushable litter is desired.

If desired, a binder may be employed, particularly if a clumping litter is to be prepared. The binder may comprise, any suitable binder; for instance, lignin sulfonate, polymeric binders, fibrillated polytetrafluoroethylene, carboxymethyl cellulose and its derivatives and its metal salts, guar gum, cellulose, xanthan gum, starch, lignin, polyvinyl alcohol, polyacrylic acid, styrene butadiene resins, polystyrene acrylic acid resins, or crosslinked polyester networks may be employed, as well as mixtures of the foregoing materials. The binder may be used in any amount with respect to the other materials and in any overall amount suitable for use in binding particles of litter. If used, the binder is preferably used in an amount ranging from 0.05% to 15%, preferably, 0.1% to 10%, by total weight of the litter. These amounts are exclusive of the amount of any such material used as a clumping agent as hereafter described.

If desired, organic or inorganic absorbents may be used in connection with the invention. In some cases, the adsorbent is an agricultural residue, such as soybean meal, soybean hulls, cottonseed meal, cotton seed hulls, canola meal, sunflower seed meal, linseed meal, safflower meal, rolled oats, crimped oats, pulverized oats, oat hulls, reground oat feed, rice bran, rice millfeed, and rice hulls, beet pulp pellets, beet pulp shreds, citrus pulp pellets, barley feed, feed wheat, milo, and ground grain screenings, wheat shorts, what brand, wheat middlings, wheat millrun, alfalfa meal, corn hominy feed, corn cobs, distillers dried grains, malt sprouts, or brewers dried grains. Other suitable absorbents include, for instance, whole ground grain, seed meal, wood chips, grain germ, spent grain germ, or the like. Combinations of the foregoing in any suitable amounts may be used If whole ground grain is used in connection with the invention, any suitable grain may be used. Exemplary whole ground grains include corn, wheat, rice, rye, sorghum, and other whole ground grains. The whole ground grain may be used in any amount desired in connection with the invention. If used, the whole ground grain may be used in any desired amount, for instance, 5%, 10%, 10%, 15%, 20%, 25%, 30%, 35%, 40%, 45%, 50%, 55%, 60%, 65%, 70%, 75%, 80%, 85%, 90%, or 95% by total dry weight of the litter.

Wood chips or dust may be used in connection with the invention. The most suitable woods include absorbent woods such as poplar, pine, birch, aspen, and cedar. If used, the wood may be used in any suitable amount, such as an amount of 5%, 10%, 15%, 20%, 25%, 30%, 35%, 40%, 45%, 50%, 55%, 60%, 65%, 70%, 75%, 80%, 85%, 90%, or 95% by total dry weight of the litter.

The litter of the invention may include a seed meal. Examples of such meals include linseed meal, soybean meal, sunflower meal, cotton seed meal, rapeseed meal, peanut meal, safflower seed meal, and combinations thereof. By "seed" is meant to include that part of a plant which is capable of forming a new plant upon germination, e.g., whole grains of wheat, including the fruit or fruit-like structure housing the seed. The seed meal comprises spent ground seed, which is seed residue from which oil has been expelled, such as by solvent extraction or expeller extraction. The extracted residue then is ground, by which is contemplated the reduction of the residue to smaller particles, preferably to a semi-course to fine powder. It is contemplated that some seeds will include a hull that may (but need not) be removed prior to expelling oil and grinding. Thus, the meal may comprise a dehulled meal or a meal that includes hulls.

Alternatively, or in addition, thereto, the litter may include a grain germ derived from any suitable grain. While grains such as wheat, corn, soy, sorghum, alfalfa, and barley are suitable for use in conjunction with the invention, the grain-based substrate, when used, preferably is a corn-based substrate. Most preferably, when used, the grain-based substrate is a grain germ, and even more preferably the substrate is corn germ that is obtained in a wet or dry milling process. The grain germ may be provided as a meal. The grain germ preferably comprises spent germ, which is grain germ from which oil has been expelled, such as by pressing or hexane or other solvent extraction. Most preferably, the grain germ has been extracted with hexane.

It has been found that washing of grain germ and seed meal, prior to the incorporation of these ingredients in an animal litter will substantially remove odor components from the substrate. By so removing the odor components, washing will render the litter more acceptable to cat owners and substantially edibly unattractive to animals such as dogs. It is further believed that washing will reduce the level of flavor components in the grain-based substrate. For these reasons, when a seed meal or grain germ is employed, preferably these materials are washed prior to incorporation into the litter. Any suitable washing step can be employed in conjunction with the invention. For example, the washing may be countercurrent washing. Any suitable washing solvent, such as an aqueous solvent, may be employed in conjunction with the invention. The washing solvent may be selected from among methanol, ethanol, hydrogen peroxide, water, and mixtures thereof; most preferably, the washing solvent is water.

In accordance with a preferred embodiment of the invention, the particles are in the form of compressed or compacted particles, i.e., in the form of granules. By "granules" is meant particles that are compressed or compacted, such as by a pelletizing, extrusion, or similar compacting step. Such compression or compacting of the particles is preferred, inasmuch as the intraparticle cohesion of the particles will be enhanced by such compacting or compressing step. The granules may be prepared by pelletizing the substrate in a commercial pellet mill. If desired, the pellets prepared thereby may be ground or crumbled to a granule size suitable for use as an animal litter. In some embodiments, the animal litter is in the form of granules having a granule size ranging from about 4 to about 400 mesh (USS); in other embodiments, about 8 to about 80 mesh; and in other embodiments about 14 to about 20 mesh. In other embodiments of the invention, the litter is prepared by other compacting or compressing processes such as, for example, by extrusion of the substrate through a die and grinding of the extrudate to a suitable granule size.

A lubricity agent, such as corn oil, palm oil, or the like optionally may be used in the pellet mill. The lubricity agent is believed to enhance the clumping property of a litter when a clumping litter is designed. Although it is not intended to limit the invention to a particular theory of operation, it is believed that the lubrication provided by the lubricity agent serves to provide a less dense particle than would otherwise be obtained in the absence of the lubricity agent. Relatively more of the internal surface area of the litter particle is thus available for wetting and for clumping. In some embodiments, a surfactant may be used in addition to or in lieu of a lubricity agent.

When used in a clumping litter formulation, the granules preferably include a clumping agent to enable or enhance the clumping property of the animal litter granules. In accordance with the invention, the clumping agent is preferably a polysaccharide, most preferably a starch such as corn starch. In some embodiments, the clumping agent is a flour, such as wheat flour or tapioca flour. The clumping agent may be present in any amount suitable to enhance or enable clumping of the litter when wetted with animal urine. Preferably, when used, the clumping agent is present in an amount of 1-50% by total dry weight.

When the animal litter of the invention is formulated as a clumping litter, the particles of litter form solid clumps upon wetting. The solid clumps may be removed as discrete entities from the remaining litter and discarded, thereby leaving unsoiled or substantially unsoiled litter. Generally, the clumping litters of the invention are prepared with palm oil residues in a substantially dry, particulate form, the particles having a particle size sufficient to provide a surface area sufficient to enable absorption of animal urine. In some embodiments, when formulated as a clumping litter, the particle size of the palm oil residue in the litter is smaller than that of the residue used in a non-clumping litter.

Especially when formulated as a clumping litter, the litter may further include a dispersing agent. The dispersing agent generally is an ionic species that is soluble in water and that assists in breaking up of the clumps upon introduction to abundant water (e.g. upon flushing into a toilet). Any suitable ionic salt may be used in conjunction with the invention. For example, in accordance with preferred embodiments of the invention, the dispersing agent, when used, is selected from among the alkali and alkaline-earth salts of common anions, such as the halide, nitrate, nitrite, carbonate, phosphate, sulfate, and bicarbonate salts, and the like. More preferably, the dispersing agent is selected from the group consisting of sodium chloride, calcium chloride, sodium carbonate, calcium carbonate, sodium bicarbonate and mixtures thereof. Even more preferably, the dispersing agent is selected from among sodium chloride, calcium carbonate, and mixtures thereof. Most preferably, the dispersing agent is sodium chloride. The dispersing agent may be present in any amount sufficient to assist in abundant water dispersing, preferably 1-5% by total dry weight of the litter. In some cases, the salt may function as a preservative in addition to providing a dispersing function. The dispersing agent may be present in a non-clumping litter and may be used in similar amounts.

As stated hereinabove, the invention may provide a clumping animal litter which agglomerates when wetted by a liquid, such as, for example, liquid animal excretions or liquid that is present in solid or semisolid animal excretions. In accordance with the invention, the litter is provided in the form of discrete plural particles of litter, at least a portion of which particles will agglomerate into at least one clump when wetted. By "agglomerate" is meant formation of a relatively cohesive interparticle consolidation of at least two particles. By "clump" is meant a relatively cohesive consolidated mass, or agglomeration, of two or more particles. It is contemplated that the clumps of animal litter formed in accordance with the invention will comprise an agglomeration of at least two particles, and preferably a greater number of particles, the exact number depending upon the volume of liquid applied and the size of the particles.

In highly preferred embodiments, when palm oil residue is used in connection with a clay-based litter, the palm oil residue is preferably present in an amount ranging from 20%-95% by total dry weight of the litter, more preferably, from 40%-80% by total dry weight of the litter, with the balance comprising clay and a binder. When palm oil residue is used in connection with the litter that does not include clay, the palm oil residue may be present in the same amount, if desired. Typically however, the palm oil residue in such litters may be present in an amount ranging from 5%-95%, preferably 50%-85%, and more preferably 20%-80%, by total dry weight of the litter. The remaining components of the litter preferably comprise one or more of the materials described herein, which materials may be present in any amounts by total weight and proportional weight to each other.

When formulated as a clumping litter, it is desirable that the particle size of the palm kernel residue particles used in the litter particles be as small as commercially practicable. Although it is not intended to limit the invention to a particular theory of operation, it is believed that a small particle size results in a relatively increased surface area, thereby enhancing wetting of the particle within the particle of animal litter. In some embodiments, the size of the palm oil residue particles is such that at least 30% pass through a 40 mesh screen. This parameter is independent of the size of the litter particles themselves.

The litter further may include a preservative, such as a mold inhibitor. Suitable preservatives include, for instance, potassium sorbate, and the propionate salts, most preferably sodium propionate and calcium propionate. When used, the preservative may be present in any amount sufficient to provide a preservative effect for the animal litter, preferably, an amount ranging from about 0.02% to about 3.5% by total dry weight.

The litter preferably further includes an acid. The acid should be present in an amount sufficient to reduce the dispersion pH of the litter to a value of pH 4-5, the dispersion pH being determined in accordance with the following procedure:

Dissolve 5.0 g±0.1 g litter sample into 100 ml distilled water
Stir to form suspension
Immerse pH meter electrode under continuous stirring
Take pH reading to nearest 0.01 pH unit Inclusion of an acid in such amounts is believed to keep the pH of animal urine sufficiently low to retard decay of urea to ammonia. Any suitable acid may be employed, such as HCl, $H_2SO_4$, other mineral acids, and organic acids such as citric and ascorbic acids. Acids also may provide or contribute to a preservative function.

When the litter is in the form of a clumpable product, the litter preferably has a moisture content sufficiently high to prevent the granules of animal litter from becoming friable and sufficiently low to allow additional moisture to be absorbed. Preferably, the moisture content is less than about 30%. More preferably, the moisture content ranges from about 3% to about 25%; even more preferably, the moisture content ranges from about 6% to about 12%. It is contemplated that some of the moisture in the animal litter will be present originally in the grain-based substrate and/or clumping agent. Some moisture is desired to prevent hornification of cellulose.

An animal litter prepared in accordance with the present teachings will be effective in suppressing odors of animal waste. Animal urine contains urea, a compound which breaks down in animal litterboxes to form ammonia. The ammonia odor of animal litterboxes is often considered to be objectionable. Animal litters made in accordance with the preferred embodiments of the invention will be effective in masking ammonia odors. A litterbox containing such litter will remain free from ammonia odors even after a substantial period of time after an animal has excreted waste into the litter.

The litters of the preferred embodiments of the invention can exhibit excellent ammonia odor control properties. Surprisingly, the litters of certain embodiments of the invention have been found effective in suppressing release of ammonia rather than merely masking ammonia odor. Although it is not intended to limit the invention to a particular theory of operation, it is believed that one or more of four phenomena are responsible. First, the pH of the litter after wetting with animal urine may be sufficiently low that ammonia is present in the form of non-volatile ammonium ion. Second, it is possible that the presence of the palm oil residue is effective in inhibiting bacterial or enzymatic activity tending to cause breakdown of the urea in animal urine. Third, urine may be bound in such manner as to inhibit or substantially prevent ammonia release. Fourth, depending upon the pH of the urine, ammonium ions may react with oils present in the litter in a saponification reaction.

The litter of the invention preferably has a density ranging from about 15 to about 45 lbs./cu.ft. More preferably, the density of the litter of the invention ranges from about 25 to about 40 lbs./cu.ft.; and even more preferably, the density is in the range of from about 30 to about 38 lbs./cu.ft. Density preferably is evaluated after loosely filling a container and measuring the weight of a specific volume of the litter.

Because the animal litter of the invention is to be used to absorb animal waste, the litter should have a sorption capacity sufficient to allow the animal litter to so function. The sorption capacity of the preferred litters of the invention typically is at least about 0.04 ml water per gram of litter, and more typically ranges from about 0.04 to about 2.4 ml/g; more typically, the sorption capacity is from about 0.8 to about 1.4 ml/g. The sorption capacity is determined per gram of animal litter, and is based on the sorption of deionized water, as described in more detail in U.S. Pat. No. 6,098,569. Preferred sorption capacity ranges of water are believed to approximate that of animal urine.

Other properties may be desired of an animal litter. For example, to minimize inconvenience and mess associated with packaging, transporting, and using the litter, the litter preferably generates a minimal amount of dust. The preferred litters of the present invention do not generate substantial dust. Another preferred property of the litters, when the litters are provided in a clumping formulation, is clumping efficiency. Clumping efficiency is the amount of litter required to form a clump with a given volume of liquid, with lower amounts of required litter corresponding to higher clumping efficiencies. Preferably, to absorb 150 ml animal urine, less than about 120 g of litter is required; more preferably, less than about 110 g is required.

Other desired properties include biodegradability and, when the litter takes the form of a clumping litter, tendency to remain clumped. Biodegradability is particularly desired when the animal owner wishes to dispose of clumps of litter by flushing them into the toilet. The litter of the invention is believed to be at least as biodegradable as hull-based materials, and thus the litter of the invention may be disposed of by flushing, even into a septic system. Litters made with clay ordinarily should not be flushed into a septic system, but may be flushable into a municipal sewer system. Tendency to remain clumped refers to the stability of the clump of clumped cat litter. A clumping litter should remain clumped for at least 48 hours after the clump has formed. The litters of the invention have an excellent tendency to remain clumped.

The invention is also directed towards a process for preparing an animal litter. In accordance with the invention, the process comprises the step of providing the ingredients as previously described, and combining them to form a litter. Preferably, the process includes a step of compacting or compressing the particles of animal litter into granules, or nuggets, or cubes, or tablets, or pellets, generally with heat and/or pressure. Preferably, the compaction is accomplished in a pelletizing step. The preservative, acid, dispersing agent, and clumping agent, when used, and generally any other ingredients employed in the litter can be added at any suitable time, and preferably are mixed with the other components of the litter in the desired proportions prior to pelletizing.

Any suitable conditions may be employed in the pellet mill used in the pelletizing operation. Moisture content in the pellet mill feed preferably is in the ranges set forth above with respect to the moisture content in the finished product, and preferably is about 6-12%. Preferably, moisture is added to the feedstock in the form of liquid water to bring the feedstock to this moisture content. The temperature in the pellet mill preferably is brought to a suitable temperature, preferably ranging from about 38° C. to about 148° C., in some instances a temperature of about 82° C., with steam. The pellet mill may be operated under any conditions that impart sufficient work to the feedstock to provide pellets. In one embodiment, the pellet mill is operated with a ⅛ in.×½ in. die at 100 lb./min. pressure at 82° C. to provide pellets, which then are crumbled in a pellet mill crumbler to provide discrete plural particles having a particle size capable of passing through an 8 mesh screen but being retained on a 20 mesh screen. The die size may be different; it is contemplated that sizes ranging from 3/32 in. to ⅝ in. and any suitable thickness may be employed. Further details concerning pelletizing can be set forth as forth in U.S. Pat. Nos. 6,868,802; 6,622,658; 6,405,677; 6,216,634; and 6,098,569.

Also encompassed by the invention is a method for the removal of animal waste. In accordance with the invention, the method comprises the steps of providing a quantity of an animal litter, and allowing an animal to excrete waste into the litter. If desired, soiled litter may be separated from the remaining quantity of unsoiled litter. In either case, some or all of the soiled litter is then removed to thereby remove animal waste. The litter may be provided in a container, which may be filled with the litter to a suitable depth, such as 1 inch, 2 inches, 3 inches, or 4 inches, preferably 3-4 inches. By "container" is meant any enclosed or partially enclosed area, such as a litterbox, a cage, a stall, a pen (such as a poultry cage), or the like. The method is contemplated to be useful for any animals, such as cats, dogs, mice, birds (especially poultry birds such as turkeys and chickens), cattle, horses, gerbils, and other animals, and finds particular applicability in connection with removal of waste from house cats and of poultry waste.

The following Examples demonstrate various embodiments of the invention, but should not be construed as limiting the invention in scope.

EXAMPLES

Example 1

Palm kernel cake is obtained commercially and is introduced to a litterbox. The palm kernel cake is placed in litterbox to a depth of three inches and is provided for use by a household cat.

Example 2

Palm oil sludge is obtained commercially and used in a litterbox as the same manner as in Example 1.

Example 3

Palm pressed fiber is obtained commercially and is used in a litterbox in the same manner as in Example 1.

Example 4

Palm kernel cake is obtained commercially and is introduced in a pellet mill. Various dies are employed and various operating conditions to produce pellets of various sizes. The temperature in the pellet mill is varied between 100° to 300° F. and the die size is varied between 3/32 in. and ⅝ in. The pellets thus obtained are crumbled and introduced to a litterbox.

Example 5

Palm kernel cake was pelletized in a pellet mill and was tested with a household cat by introducing the litter to the box to a depth of about 3 to 4 inches. After cats had used the litter, the pellets broke down into small pieces upon absorbing cat urine. Periodically, the litterbox was shaken by hand such that the soiled powdery waste material dropped to the bottom of the box, while unsoiled litter remained at the top of the box. It was observed that the litterbox had a low ammonia odor and that, because the powdered waste materials had dropped to the bottom of the box, litter tracking out of the box by the cat was minimized.

Example 6

A litter having the following formulation was prepared.

| Ingredient | Total Dry Weight % |
| --- | --- |
| Palm Kernel Cake | 23% |
| Corn Starch | 12% |
| Ground Whole Corn | 31.85% |
| Spent Corn Germ meal | 26.25% |
| Ground Virgin Germ | 3.75% |
| Citric Acid | 1% |
| Salt | 2% |
| Potassium Sorbate | 0.15% |

The foregoing ingredients were introduced to a pellet mill having a die size of ⅛ in. diameter and ½ in. thickness. Pellets thus produced may be crumbled and used as an animal litter.

Example 7

A clay-based animal litter is prepared by combining the following ingredients.

| Ingredients | Total Dry Weight % |
| --- | --- |
| Palm Kernel Cake | 70% |
| Bentonite Clay | 29.5% |
| Guar Gum | 0.5% |

Example 8

The following animal litters were prepared. In Examples 8A-C, the defatted palm kernel pellets were ground using a hammer mill with a 3/16 in. opening screen to yield a relatively coarse ground palm kernel pellet powder. In Examples 8D-F, the defatted palm kernel pellets were ground through an Alpine mill and then a Fitz mill to yield to a relatively fine ground palm kernel pellet powder. In each case, the blend was pelletized using a California Pellet Mill with a with 5/32 in.×½ in. depth die. Steam was injected into the pre-conditioner of the pellet mill to heat the blend to 140° F.-165° F. and to increase moisture content. The pellets produced by the pellet mill formed were crumbled to form discrete plural particles.

The following formulations were prepared. These were evaluated for clump formation as indicated below, yielding the results indicated.

TABLE 3

|  | Formulation | | | | | |
| --- | --- | --- | --- | --- | --- | --- |
|  | 8A | 8D | 8C | 8D | 8E | 8F |
| Coarse ground palm kernel pellet | — | — | — | 72 | 72 | 72 |
| Fine ground palm kernel pellet | 72 | 72 | 72 | — | — | — |
| Corn Starch* | 25 | 23 | 22 | 25 | 23 | 22 |
| Palm oil blend | — | 2 | 3 | — | 2 | 3 |
| Salt | 2 | 2 | 2 | 2 | 2 | 2 |
| Citric acid | 1 | 1 | 1 | 1 | 1 | 1 |
| Properties |  |  |  |  |  |  |
| Clumping | Good clumping | Good clumping | Good clumping | Poor clumping | Poor clumping | Poor Clumping |
| Clump Weight** (g) | 60.7 | 56 | 55.7 |  |  |  |

*Starch B20F, available from Grain Processing Corporation of Muscatine, Iowa
**Clump weight. --- Weight of 30 ml or gram of urine + litter used in grams as measured after 5 minutes of forming the clump.

Typical particle size profiles resulting from the two different grinding processes were as follows. The data for each screen size is not cumulative.

TABLE 4

|  | Process | % over 20 mesh | % over 40 mesh | % over 80 mesh | % over 120 mesh | % over 200 mesh | % through 200 mesh |
| --- | --- | --- | --- | --- | --- | --- | --- |
| Fine ground palm kernel pellet | 1 pass thru Fitz, 1 pass thru Alpine mills | 0.4 | 1.7 | 49.2 | 48.4 | 0.7 | 0 |
| Coarse ground palm kernel pellet | Hammer mill with 3/16 in. screen | 23.2 | 33.2 | 28.1 | 13.6 | 1.8 | 0 |

A ground palm kernel powder having a particle size profile finer than this profile will help lower the clump weight even further. For economic reasons, the ground defatted palm kernel may have a particle size profile between the two profiles. A ground palm kernel powder having the following profile is deemed satisfactory.

TABLE 5

| % over 20 mesh | % over 40 mesh | % over 80 mesh | % over 120 mesh | % over 200 mesh | % through 200 mesh | Total |
| --- | --- | --- | --- | --- | --- | --- |
| 6 | 30 | 36 | 20 | 6 | 2 | 100 |

It was determined that the ground defatted palm kernel with this particle size profile can absorb as much as 2.20 times its own weight of water.

Example 9

Three litters were prepared. In all three runs, the defatted palm kernel pellets were ground using a hammer mill with a 1/16 in. opening screen. The blends were pelletized using a California Pellet Mill with a with 5/32 in.×1/2 in. depth die. Steam was injected into the pre-conditioner of the pellet mill to heat the blend to 140° F.-165° F. The pellets thus formed were crumbled to form discrete plural particles.

TABLE 6

|  | Formulation | | |
| --- | --- | --- | --- |
|  | 9A | 9B | 9C |
| Fine ground palm Kernel pellet (Hammer mill-1/16 in. screen) | 71.850% | 69.850% | 68.850% |
| Tapioca Flour | 23.00% | 22.00% | 21.00% |
| Palm Oil | 2.00% | 5.00% | 7.00% |
| Salt | 2.00% | 2.00% | 2.00% |
| Citric acid | 1.00% | 1.00% | 1.00% |
| Potassium Sorbate | 0.15% | 0.15% | 0.15% |
| Properties |  |  |  |
| Clumping | Poor clumping | Poor clumping | Good clumping |
| 5-min. Clump Weight* (g) | N/A | N/A | 63.3 grams |

*Clump weight. - Weight of 30 ml or gram of urine + litter used in grams as measured after 5 minutes of forming the clump.

It is thus seen that the use of a lubricity agent can affect the clumping property of the litter.

Example 10

The following litters were prepared and evaluated. In all runs, the defatted palm kernel pellets were ground using a hammer mill with a 1/16 in. opening screen. The blends of all materials were pelletized using a California Pellet Mill having a 5/32 in.×1/2 in. depth die. Steam was injected into the pre-conditioner of the pellet mill to heat the end to 140° F.-165° F. The pellets formed were crumbled to form discrete plural particles.

TABLE 7

| | Formulation | | | | | |
|---|---|---|---|---|---|---|
| | 10A | 10B | 10C | 10D | 10E | 10F |
| Fine ground palm Kernel pellet (Hammer mill-1/16 in. screen) | 61.850% | 54.850% | 46.850% | 59.850% | 52.850% | 44.850% |
| Tapioca Flour | 30.00% | 37.00% | 45.00% | 30.00% | 37.00% | 45.00% |
| Palm Oil | 5.00% | 5.00% | 5.00% | 7.00% | 7.00% | 7.00% |
| Salt | 2.00% | 2.00% | 2.00% | 2.00% | 2.00% | 2.00% |
| Citric acid | 1.00% | 1.00% | 1.00% | 1.00% | 1.00% | 1.00% |
| Potassium Sorbate | 0.15% | 0.15% | 0.15% | 0.15% | 0.15% | 0.15% |
| Properties | | | | | | |
| Clumping | Poor clumping | Good clumping | Good Clumping | Good clumping | Good clumping | Good Clumping |
| 5-min. Clump Weight* (g) | | 64.1 | 62.6 | 62.2 | 64.6 | 66.1 |

*Clump weight. --- Weight of 30 ml or gram of urine + litter used in grams as measured after 5 minutes of forming the clump.

It is thus seen that the proportions of the various components of the litter may be modified.

Example 11

Palm kernel pellets were ground through a hammer mill with a 1/16 in. opening screen to a fine powder and then blended with tapioca flour and other materials.

TABLE 8

| Ingredient | % of total ingredients |
|---|---|
| Fine Ground Palm Pellet (Hammer mill-1/16 in. screen) | 61.85% |
| Tapioca Flour | 30.00% |
| Palm Oil | 5.00% |
| Salt | 2.00% |
| Citric acid | 1.00% |
| Potassium Sorbate | 0.15% |
| Properties | |
| Clumping | Good clumping |
| 5-min. Clump Weight* (g) | 60 |

The blend was pelletized using a 100 hp California Pellet Mill with a die of 3/16 in. diameter×2 in. depth (4.7625 mm×50.8 mm). Steam was injected into the pre-conditioner of the pellet mill to heat the blend to 140° F.-165° F. The pellets thus formed were crumbled. Upon wetting, the particles formed solid clumps with a weight of 60 grams. The litter had a sand-like texture that was not fluffy. The litter had excellent ammonia controlling ability.

Example 12

Palm kernel pellets were ground through a hammer mill with a 1/16 in. opening screen to a fine powder and then blended with tapioca flour and other materials.

TABLE 9

| Ingredient | % of total ingredients |
|---|---|
| Fine Ground Palm Pellet (Hammer mill-1/16 in. screen) | 54.85% |
| Tapioca Flour | 37.00% |
| Palm Oil | 5.00% |
| Salt | 2.00% |
| Citric acid | 1.00% |
| Potassium Sorbate | 0.15% |
| Properties | |
| Clumping | Good clumping |
| 5-min. Clump Weight* (g) | 58.5 |

The blend was pelletized using a 100 hp California Pellet Mill with a die of 3/16 in. diameter×2 in. depth (4.7625 mm×50.8 mm). Steam was injected into the pre-conditioner of the pellet mill to heat the blend to 140° F.-165° F. The pellets thus formed were crumbled. Upon wetting, the particles formed solid clumps with a weight of 58.5 grams. The litter had a sand-like texture that was not fluffy.

The litter exhibited excellent ammonia controlling and control ability over a long period of time. Cat urine clumps collected from the animal litter were sealed in 1/2 gallon containers. Ammonia contents in the headspaces of the containers were measured using a Dragger tube ammonia detector. The following results were obtained.

| Headspace Ammonia (ppm) | | |
| --- | --- | --- |
| | Animal litter of Example 12 | Control |
| Day 1 | 0 | 0 |
| Day 6 | 0 | 20 |
| Day 7 | 0 | 40 |
| Day 10 | 0 | 100 |
| Day 11 | 0 | — |
| Day 13 | 0 | — |
| Day 14 | 0 | — |

Hardly any ammonia content was detected in the headspace after two weeks. By comparison, ammonia content released from commercial cat litters after the first week was substantial.

Example 13

Palm kernel pellets are ground through a hammer mill with a 1/16 in. opening screen to a fine powder and then blended with tapioca flour and other materials.

TABLE 10

| Ingredient | % of total ingredients |
| --- | --- |
| Fine Ground Palm Pellet (Hammer Mill 1/16 in. screen) | 57.85% |
| Tapioca Flour | 34.00% |
| Vegetable oil | 5.00% |
| Salt | 2.00% |
| Citric acid | 1.00% |
| Potassium Sorbate | 0.15% |

The blend is pelletized as heretofore described.

Example 14

Palm kernel pellets are ground through a hammer mill with a 1/16 in. opening screen to a fine powder and then blended with corn starch and other materials.

TABLE 11

| Ingredient | % of total ingredients |
| --- | --- |
| Fine Ground Palm Pellet (Hammer mill-1/16 in. screen) | 57% |
| Unmodified Corn Starch (B200) | 34.00% |
| Vegetable oil | 7.85% |
| Salt | 2.00% |
| Citric acid | 1.00% |
| Potassium Sorbate | 0.15% |

The blend is pelletized as heretofore described

Example 15

Palm kernel pellets are ground through a hammer mill with a 1/16 in. opening screen to a fine powder and then blended with corn starch and other materials.

TABLE 12

| Ingredient | % of total ingredients |
| --- | --- |
| Fine Ground Palm Pellet (Hammer mill-1/16 in. screen) | 57% |
| Unmodified Corn Starch (B200) | 32.00% |
| Corn germ | 7.85% |
| Salt | 2.00% |
| Citric acid | 1.00% |
| Potassium Sorbate | 0.15% |

The blend is pelletized as heretofore described.

Example 16

Palm kernel pellets are ground through a hammer mill with a 1/16 in. opening screen to a fine powder and then blended with other materials.

TABLE 13

| Ingredient | % of total ingredients |
| --- | --- |
| Fine Ground Palm Pellet (Hammer mill-1/16 in. screen) | 57% |
| Wheat Midds (flour mill by-product) | 35.00% |
| Vegetable oil or palm oil | 5% |
| Salt | 2.00% |
| Citric acid | 1.00% |
| Potassium Sorbate | 0.15% |

The blend is pelletized as heretofore described.

It is thus seen that a satisfactory animal litter is prepared using a palm oil residue.

All references, including publications, patent applications, and patents, cited herein are hereby incorporated by reference. In any listing of possible ingredients or components, mixtures of the possible ingredients or components are contemplated unless expressly indicated otherwise. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention unless otherwise claimed. No language in the specification should be construed as indicating any non-claimed element as essential to the practice of the invention. This invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Materials indicated as useful in a clumping litter formulation may be used in non-clumping litters, and materials indicated as useful in a non-clumping litter formulation may be used in clumping litters.

The invention claimed is:

1. An animal litter comprising a palm oil residue and at least one absorbent selected from the group consisting of whole ground grain, spent germ, virgin germ, seed meal, and clay, said litter being in the form of discrete plural particles.

2. An animal litter according to claim 1, including spent germ.

3. An animal litter according to claim 2, further comprising a clumping agent.

4. An animal litter according to claim 1, said litter being in the form of discrete plural particles that tend to agglomerate when wetted to form a clump.

5. An animal litter according to claim 4, said clumping agent comprising a polysaccharide.

6. An animal litter according to claim 1, comprising palm kernel cake.

7. An animal litter according to claim 1, comprising palm oil sludge.

8. An animal litter according to claim 1, comprising palm pressed fiber.

9. An animal litter according to claim 1, including spent corn germ, said litter being in the form of discrete plural particles that tend to agglomerate into a clump when wetted.

10. An animal litter according to claim 9, further comprising a clumping agent.

11. An animal litter according to claim 1, comprising a clay.

12. An animal litter according to claim 11, further comprising a binder.

13. A process for preparing animal litter comprising combining a palm oil residue and at least one other absorbent material selected from the group consisting of virgin germ, spent germ whole ground grain, seed meal, and clay.

14. An animal litter comprising at least one palm oil residue selected from the group consisting of palm pressed fiber, palm oil sludge, and palm kernel cake and at least one absorbent selected from the group consisting of whole ground grain, spent germ, virgin germ, seed meal, and clay, said litter being in the form of discrete plural particles.

* * * * *

UNITED STATES PATENT AND TRADEMARK OFFICE
CERTIFICATE OF CORRECTION

PATENT NO. : 7,757,638 B2
APPLICATION NO. : 11/756209
DATED : July 20, 2010
INVENTOR(S) : Lin Wang and Sarjit Johal It is certified that error appears in the above-identified patent and that said Letters Patent is hereby corrected as shown below:

In the Claims

In column 17, line 31, in Claim 5 delete "4" insert --3--

Signed and Sealed this
Thirtieth Day of April, 2013

Teresa Stanek Rea
*Acting Director of the United States Patent and Trademark Office*